United States Patent [19]

Stebbings

[11] Patent Number: 4,602,380

[45] Date of Patent: Jul. 22, 1986

[54] COMPATIBLE TRANSMISSION TECHNIQUES FOR FM STEREOPHONIC RADIO AND TELEVISION

[75] Inventor: David W. Stebbings, Ridgefield, Conn.

[73] Assignee: CBS Inc., New York, N.Y.

[21] Appl. No.: 688,940

[22] Filed: Jan. 4, 1985

[51] Int. Cl.[4] ............................................. H04H 5/00
[52] U.S. Cl. .................................... 381/13; 329/124; 329/130; 329/132; 332/23 A
[58] Field of Search .................... 381/2, 3, 4, 5, 13, 381/106; 333/14; 329/124, 130, 132, 135, 146; 332/17, 21, 22, 23 A, 40, 44, 48

[56] References Cited

U.S. PATENT DOCUMENTS

| 3,067,292 | 12/1962 | Minter, II | 381/2 |
| 4,016,366 | 4/1977 | Kurata | 381/5 |
| 4,338,491 | 7/1982 | Parker et al. | 381/16 |
| 4,376,916 | 3/1983 | Glaberson | 333/14 |
| 4,485,483 | 11/1984 | Torick et al. | 381/4 |
| 4,534,054 | 8/1985 | Maisel | 381/14 |

Primary Examiner—Forester W. Isen
Attorney, Agent, or Firm—Spencer E. Olson

[57] ABSTRACT

A stereophonic broadcasting system incorporating companding of the difference signal in which both the usual difference signal and a compressed version of the difference signal are transmitted to one or more remote receivers. At the receiver the usual difference signal and the compressed difference signal are combined and the resulting signal then expanded to obtain a noise-reduced difference signal for matrixing with the sum signal to obtain the original left and right signals. Utilizing both difference signals increases the effective level of the received difference signal by 6 dB, whereas the noise is increased only 3 dB, for a net improvement of 3 dB in signal-to-noise ratio. Utilization of both difference signals at the receiver also permits compression of the difference signal according to any desired compression law.

17 Claims, 16 Drawing Figures

COEFFICIENTS:
$A = 0.45(M) + 0.45(S)\sin wt + 0.45(S')\cos wt + 0.1\sin\frac{wt}{2}$

COMPATIBLE TRANSMISSION TECHNIQUES FOR FM STEREOPHONIC RADIO AND TELEVISION

BACKGROUND OF THE INVENTION

This invention relates to FM broadcasting systems and, more particularly, to transmission techniques for increasing the channel capacity and coverage area of FM stereophonic broadcasting systems for both radio and television applications while maintaining compatability with existing monophonic and stereophonic radio receivers and with the transmission standards for stereo television recently adopted by the Electronic Industries Association (EIA).

The potential of FM sound broadcasting has long been recognized, primarily due to its relative immunity to electromagnetic interference and its ability to provide full audio bandwidth with low noise. Although FM stereo adds a new acoustical dimension to radio reception, it does so only at the expense of serious degradation of signal-to-noise ratio. The noise penalty in stereophonic broadcasting is well known, there being several factors which contribute to the higher noise levels and coverage losses resulting from multi-channel sound transmissions. When a broadcast station converts to biphonic service, monophonic coverage is reduced because signal power must be divided among the various components of the more complex baseband signal. (The term "biphonic" will be used hereinafter to clearly differentiate two-channel broadcasting from other forms of stereophony such as triphonic and quadraphonic broadcasting.) The biphonic signal-to-noise ratio is lower than monophonic signal-to-noise ratio because of the wide bandwith of the composite signal containing the monophonic sum signal M, the pilot signal p, and the stereophonic difference signal S. With a baseband spectrum extending to 53 kHz for biphonic transmissions, the noise level is particularly high because of the rising spectral characteristic due to frequency modulation. The so-called "triangular" noise spectrum increases 6 dB per octave with increasing frequency of the composite signal, and although audio de-emphasis counteracts this somewhat, the noise problem is still severe. After demodulation, the noise components of the difference channel sub-carrier are added, statistically independent, to the noise already present in the monophonic signal during audio dematrixing.

Instead of here describing the factors that must be taken into account in estimating the theoretical loss of signal-to-noise ratio, attention is directed to U.S. Pat. No. 4,485,483 dated Nov. 27, 1984 of Emil L. Torick and Thomas B. Keller, the disclosure of which is hereby incorporated herein by reference, for a summary of a number of studies that have been made of signal-to noise degradation. In general, these studies conclude that there is a 26 dB penalty for stereophonic programming with wide audio separation, whereas for monophonic receivers noise degradation is in the range from 1 dB to 7 dB. Such losses of signal-to-noise ratio result in a reduction in the effective area of coverage of a broadcast station, studies having shown that with biphonic transmission the two-channel reception range is only approximately one-half the monophonic reception range.

The above-mentioned patent describes a biphonic FM radio broadcasting system that is fully compatible with existing receivers and which through improvement of signal-to-noise significantly extends the area of coverage of an FM broadcasting station. In the disclosed system (hereinafter sometimes referred to as the "Torick/Keller system") the usual left and right signals are conventionally matrixed to obtain conventional sum (M) and difference (S) signals. The difference signal is used to amplitude-modulate a first sub-carrier signal and at the same time is applied to a compressor which compresses its dynamic range to produce a compressed difference signal S'. The compressed difference signal S' is used to amplitude-modulate a second sub-carrier signal of the same frequency but in quadrature phase relationship with the first. Suppressed-carrier, double-sideband modulation of each sub-carrier is employed, with the frequency of the sub-carrier signal being sufficiently high to assure a frequency gap between the lower sidebands of the modulated sub-carrier signals and the M signal. A conventional low-level phase reference pilot signal, lying within the aforementioned frequency gap, is employed for detection purposes at the receiver. The M signal, the two modulated sub-carrier signals, and the pilot signal are frequency modulated onto a high frequency carrier for transmission purposes. The receiver includes a demodulator for deriving the M signal, the normal difference signal S and the compressed difference signal S', and an expander for complementarily expanding the derived compressed difference signal. The expanded noise-reduced version of the difference signal is combined with the derived sum signal M to obtain the original left (L) and right (R) signals. The receiver also includes switch means for applying the normal difference signal, instead of the expanded version of the derived difference signal, to the combining means to enable the receiver for reproduction of conventional stereophonic signals.

In effect, then, the Torick/Keller system embodies the concept of companding a channel that is additional to that normally used for stereo and to code it in a way so as to not increase the bandwidth requirements for transmission. By companding the difference (L−R) signal, which gives 22 dB to 26 dB signal-to-noise improvement in the transmission chain, the stereo listener theoretically enjoys the same signal-to-noise ratio as does the conventional monophonic listener. This amount of reduction of received noise greatly increases the effective stereo service area; in general, the radius from the transmitter to the point at which an acceptable signal is no longer received is at least doubled as compared to that for conventional stereo, which means that four times the number of potential listeners will receive an acceptable signal.

In the application of stereophonic sound to television according to the system recently adopted by the Electronic Industries Association (EIA), the difference signal (L−R) is compressed by a dbx Inc. compressor to give the signal-to-noise improvement necessary to overcome the penalty in signal-to-noise as compared to monophonic transmission. The compressed difference signal is used to amplitude-modulate a sub-carrier and the amplitude-modulated sub-carrier and the usual sum signal M, and a pilot signal, are frequency modulated onto a high frequency carrier for transmission purposes. Only the compressed difference signal is transmitted; that is, there is no transmission of an uncompressed difference signal. Thus, the signal can be compatibly received by existing monophonic television receivers, but cannot be received by existing FM stereo radio receivers; but since there had not previously been a standard for stereophonic television, compatibility was not a problem in the adoption of the EIA stereo television system.

A primary object of the present invention is to provide an FM stereophonic broadcasting system which exhibits a greater signal-to-noise improvement than that obtainable with the Torick/Keller system.

A corollary object is to provide an FM stereo broadcast system which better utilizes the greater channel capacity of the Torick/Keller system while still realizing its improved signal-to-noise advantage.

Still another object of the invention is to compatibly improve the stereo television system recently agreed to by the EIA, wherein only a compressed audio difference signal of reduced maximum amplitude is transmitted, by also transmitting an unchanged difference signal in quadrature.

SUMMARY OF THE INVENTION

The FM stereophonic broadcasting system according to the invention, whether for radio or television, is similar to the Torick/Keller system in that the usual difference signal S and a compressed difference signal S' are both transmitted. However, unlike the Torick/Keller radio system, in which only the expanded version of the received compressed difference signal is matrixed with the sum signal M to obtain the original L and R signals, the receiver according to the invention combines the usual difference signal S and the compressed difference signal S', expands the resulting signal to obtain a noise-reduced difference signal and matrixes this noise-reduced difference signal with the derived sum signal M to obtain the original L and R signals. The signal content of S and S' being the same, combining them by summing increases the effective level of the received difference signal by 6 dB, whereas the noise is increased only 3 dB by virtue of the fact that the noise from the S channel and the noise from the quadrature S' channel can be considered as coming from two statistically independent noise sources whose outputs add as the square root of the sum of the squares; this means that the resultant noise in the sum signal (S+S') would be only 3 dB, resulting in a net improvement of 3 dB in signal-to-noise ratio. Alternatively, the process of decoding and adding the S and S' signals can be accomplished in a single operation by arranging the decoding axis to be at 45° with respect to the axes of transmission of the S and S' signals. In this case, the signal level from the decoder is increased by the square root of the sum of the squares of the S and S' signals, resulting in a received signal level increase of 3 dB, yet with the same noise contribution as for a one-axis decoder. There is, therefore, a 3 dB improvement in received signal-to-noise ratio, the same result as when both axes are decoded independently and summed after decoding.

The transmission of the unchanged normal difference signal S, coupled with the utilization at the receiver of both the normal and the compressed difference signal, allows the transmission of the compressed signal according to any desired companding law. For example, instead of being limited to the 2:1 slope typical of the "CX" compander described in commonly assigned U.S. Pat. No. 4,376,916, or other known companding systems, the invention makes possible the use of a compander system having an infinity-to-one ($\infty$:1) or similar companding characteristic which provides a subjective 10 dB to 12 dB improvement against noise pumping for a given amount of gain reduction over what is realizable with such prior art companders.

Additionally, because it is transmitted completely unchanged, the normal difference signal can be used at the receiver as a reference signal for controlling the level of the noise-reduced signal delivered by the expander so as to cause the amplitude of the sum signal (S+S') to equal the level of the normal difference signal and thus insure proper dematrixing with the received sum signal M. This feature, which is disclosed and claimed in the commonly assigned co-pending application Ser. No. 688,854 filed concurrently herewith by the present applicant and Aldo G. Cugnini and Daniel W. Gravereaux, offers the important advantage that should improved companding characteristics be developed it would not be necessary to build new receiver decoders to exploit them; it would be necessary only to alter the compressor (at the transmitter) and control the output level of the "new" expander with the normal difference signal. Since the received unmodified signal S contains the complete information about the original (L−R) bi-phonic difference signal, the difference in the dynamic characteristics of the received S and S' signals gives a clue as to the values of these time constants; a "smart" decoder can be made sensitive to these values and be arranged to apply appropriate corrections. Also, since the signal S is unmodified, the relationship between the signal amplitudes of the various frequency bands of such companders as Dolby A and Dolby B or dbx for stereo television is also unchanged in this signal. It can, therefore, be used as a reference to re-establish the correct dynamic frequency response of any companding system.

The above-outlined improvements are also obtainable in the agreed EIA/dbx stereophonic television application by additionally transmitting an unchanged difference signal in quadrature with the compressed difference signal, which can be done with no loss in service area and without affecting compatiblity for existing stereo television receivers. By exploiting both signals at the receiver in accordance with the principles outlined above, it is possible to design an improved receiver that would (a) receive an improved signal-to-noise ratio signal with less modulation of the noise; (b) enable the use of adaptive decoders; (c) require no more spectrum space; and (d) have improved high signal level signal-to-noise ratio.

BRIEF DESCRIPTION OF THE DRAWINGS

Other objects, features, and advantages of the invention, and a better understanding of its construction and operation, will be had from the following detailed description when considered in conjunction with the accompanying drawings, in which.

DETAILED DESCRIPTION

Figure 1:
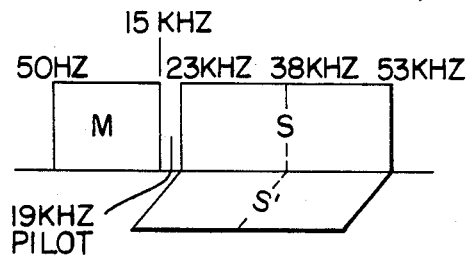
FIG. 1 is a frequency diagram of the composite baseband signal developed in accordance with the principles of the present invention.

Inasmuch as the FM stereophonic radio broadcasting system according to the invention is designed to be compatible with the existing two-channel stereo system approved by the FCC, it will be useful background for an understanding of the present invention to briefly review the basic principles of the existing system. In the current system, stereophonically related signals L and R are added together to form a sum signal M having frequencies up to about 15,000 Hz. To this is added a double-sideband suppressed 38 kHz sub-carrier signal S sin ωt, where S=(L−R), and a 19 kHz pilot signal for receiver synchronization purposes. The composite modulation signal can be written:

$$e_m = M + p\sin\frac{\omega t}{2} + S\sin\omega t \qquad \text{Eq.(1)}$$

where $\omega = 2\pi f_s = 38$ kHz, and p is the amplitude of the 19 kHz pilot. It is seen from the baseband spectrum illustrated in FIG. 1 that it comprises a monophonic channel M from about 50 Hz to 15 kHz, a 19 kHz pilot, and a stereophonic difference channel S sin ωt from 23 to 53 kHz.

In common with the Torick/Keller system, in the transmitter of the present system a compressed difference signal designated S' is added to the conventional composite FM signal. The compressed difference signal is conveniently transmitted as a double-sideband suppressed 38 kHz quadrature sub-carrier signal S' cos ωt. Thus, the composite baseband signal may be represented by the following equation:

$$e_m = M + p\sin\frac{\omega t}{2} + S\sin\omega t + S'\cos\omega t \qquad \text{Eq.(2)}$$

where p represents the amplitude of the pilot signal and $\omega = 2\pi \cdot 38$ kHz. The quadrature sub-carrier requires no additional spectrum space and, as has been noted earlier, imposes only a small penalty in modulation potential, which is largely overcome by the present invention.

Figure 2:
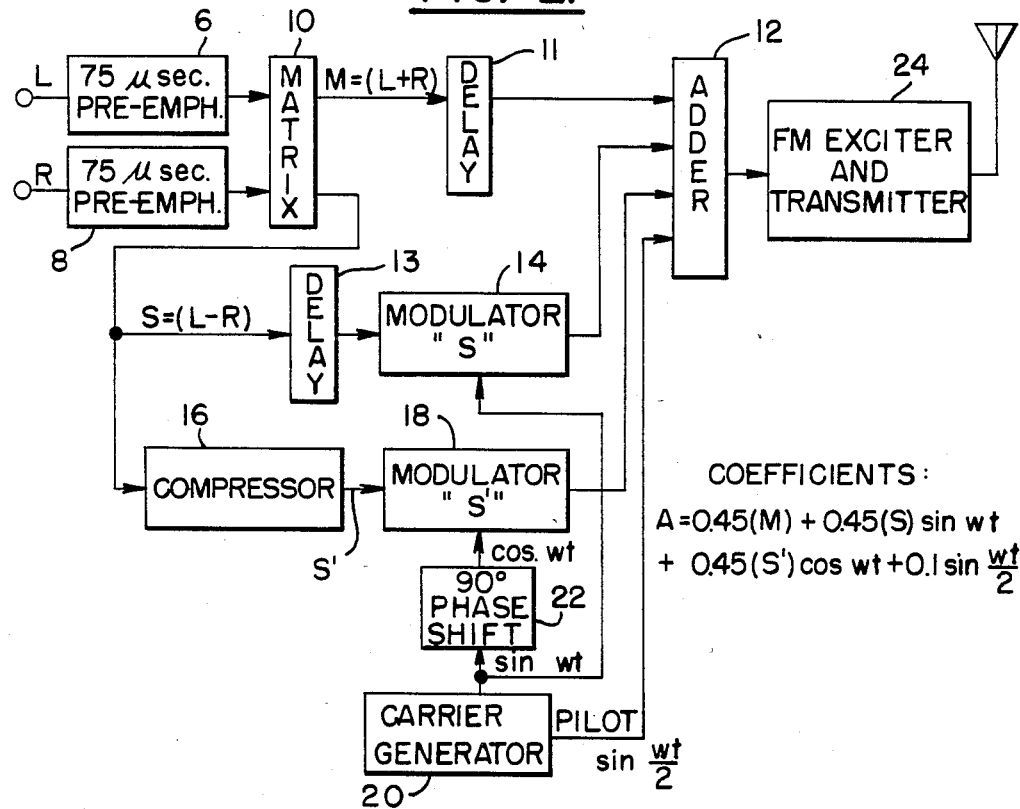
FIG. 2 is a simplified block diagram of a transmitting terminal for generating and transmitting the composite signal of FIG. 1.

A transmitter for generating this composite signal is illustrated in FIG. 2 which, in the interest of simplicity, omits some of the more conventional transmitter circuits. The two audio frequency signals L and R, derived from separate sources (not shown), are applied via conventional 75 μsec. pre-emphasis networks 6 and 8, respectively, to the inputs of a conventional matrix network 10 consisting, for example, of a network of summing amplifiers arranged to produce at the output terminals of the matrix the two audio signals M=(L+R) and S=(L−R). The monophonic sum signal M is applied via a first delay device 11 to one input to an adder 12, and the stereophonic difference signal S is applied via a second delay device 13 to the input of a first modulator 14, and also to the input of a compressor 16 of a companding system; the compressor may be one of several types which will be described later. The compressed difference signal from the compressor, designated S', is applied to the input of a second modulator 18, the output of which is delivered to adder 12 where it is linearly combined with the monophonic sum signal M and the signal from modulator 14. The delays introduced by delay devices 11 and 13 are such as to insure that the M signal and the two modulated signals arrive at the adder simultaneously.

The sub-carrier and pilot signals are derived from a carrier generator 20 which provides a sine wave signal having a frequency of 38 kHz which is applied to modulator 14 and also to a phase shift network 22 of known construction for providing a 90° phase displacement between the sub-carrier signal applied to modulator 18 and the sub-carrier applied to modulator 14. The modulators 14 and 18 comprise suppressed-carrier amplitude modulators of known construction which serve to amplitude-modulate the two sub-carriers with respective audio frequency signals so as to produce the two double-sideband, suppressed-carrier, amplitude-modulated sub-carrier signals S sin ωt and S' cos ωt. These two signals are then combined in adder 12 with the sum signal M and a 19 kHz sine wave pilot signal, also derived from carrier generator 20. The composite signal produced at the output of adder 12 set forth in Eq. (2), having the amplitude coefficients shown in FIG. 2, is then applied to the FM exciter of a transmitter 22 and frequency modulated onto a high frequency carrier for transmission to one or more remote receivers. It will be noted that the amplitude coefficients of the signal components in common with conventional FM stereo are the same as for conventional FM stereo, and that the amplitude coefficient of the quadrature signal is also 0.45; that is, it is unnecessary to reduce the amplitude coefficients of signals M and S in order to avoid overmodulation of the transmitter. Modulator 14, designated the "S" modulator, receives the inphase carrier, and the second modulator, designated modulator "S", receives the quadrature sub-carrier.

Figure 3:
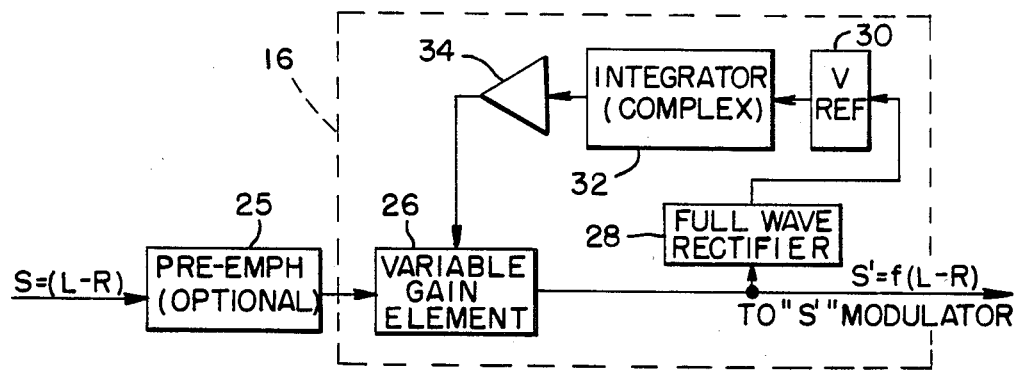
FIG. 3 is a simplified block diagram of a feedback type of compressor useful in the system of FIG. 2.
Figure 4:
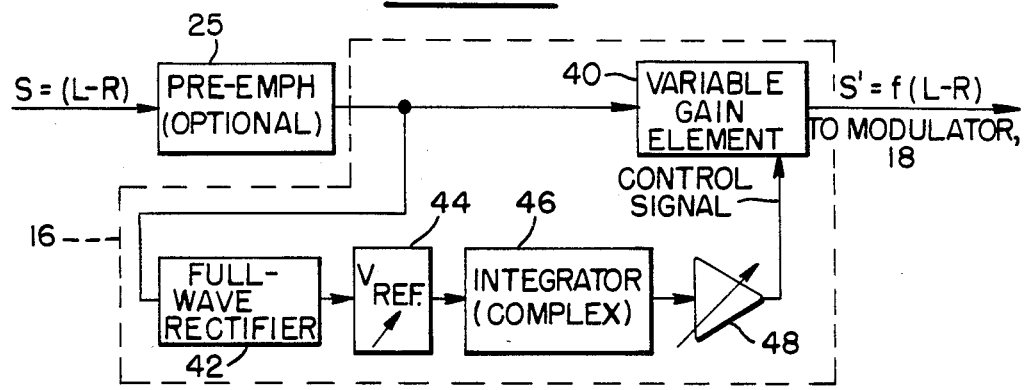
FIG. 4 is a simplified block diagram of a feed forward type of compressor useful in the system of FIG. 2.

The compressor 16 may take the form of any of several known arrangements, including the feedback type illustrated in FIG. 3 and the feed-forward type shown in FIG. 4. Referring to FIG. 3, the difference signal (L−R) is applied to the compressor 16 via a pre-emphasis network 25, if required, and enters the input of a variable gain element 26 which is controlled by a direct voltage derived from its output signal, designated S', and which is a function of the difference signal (L−R). This output signal is fed to a control voltage generator circuit which includes a full-wave rectifier 28 for producing a direct voltage signal having a level proportional to the amplitude of the applied alternating signal S'. The control loop further includes a settable voltage reference device 30, which may be incorporated as part of the rectifier or, alternatively, may be inserted at some other point in the loop, for determining the knee of the transfer characteristic of the compressor. The direct voltage output from rectifier 28 is proportional to the amplitude of signal S' when the latter exceeds the threshold level $V_{ref}$, and is equal to the threshold voltage when the amplitude of signal S' is less than the threshold, so that input signals having amplitudes above the threshold are compressed and signals having amplitudes below the threshold are not compressed. The direct voltage produced by rectifier 28 and threshold device 30 is applied to an integrator 32 which may be of the type described in commonly assigned U.S. Pat. No. 4,376,916 which includes a network of at least three signal paths having differing time constants, the network having a common input terminal for receiving the rectified signal and a common output terminal at which the control signal for the variable gain element is developed. All except one of the signal paths each includes a diode for causing the respective path to be conductive only in response to the rectified signal exhibiting a change in amplitude sufficient to exceed a predetermined voltage, and the said one signal path conducts in response to any differential in voltage between the input and output terminals. The signal delivered by integrator 32 is amplified by a suitable amplifier 34 and applied as a control signal to variable gain element 26. The control signal delivered by the described network causes the output signal delivered by element 26 to not noticeably modify the information content of the source signal. The control signal generating loop has a high loop gain which enables generation of a very linear transfer characteristic, the nature of which will be discussed following description of the feed-forward type of compressor illustrated in FIG. 4.

Referring now to FIG. 4, the feed-forward type of compressor has the same basic elements as the just-described feedback type but differs in that the control signal is derived from the input to a variable gain element 40 instead of from the output. Briefly, the difference signal S, with or without pre-emphasis as necessary, is applied to the input of variable gain element 40 and also to the input of a full-wave rectifier 42, which may have a settable voltage reference device 44 embodied therein for setting the knee of the transfer characteristic. The direct voltage from the rectifier and voltage reference device 44 is applied to an integrator 46 having the configuration described above in connection with FIG. 3, the output of which is amplified by a controllable amplifier 48 and then applied as a control signal to variable gain element 40. The compressed output signal S', the amplitude of which is a function of (L−R), is applied to the input of modulator 18. As is known, the feed-forward type of compressor is subject to two restrictions which do not apply to the feedback type: (1) in order for the input signal versus output signal to follow a given law the variable gain element itself must have a calibrated and prescribed transfer characteristic; and (2) the control signal must be developed with appropriate gain and offsets to match that law. In other words, the gains and offsets of the control signal generating loop and the variable gain element itself must all be chosen specifically to give the desired characteristic.

Figure 5:
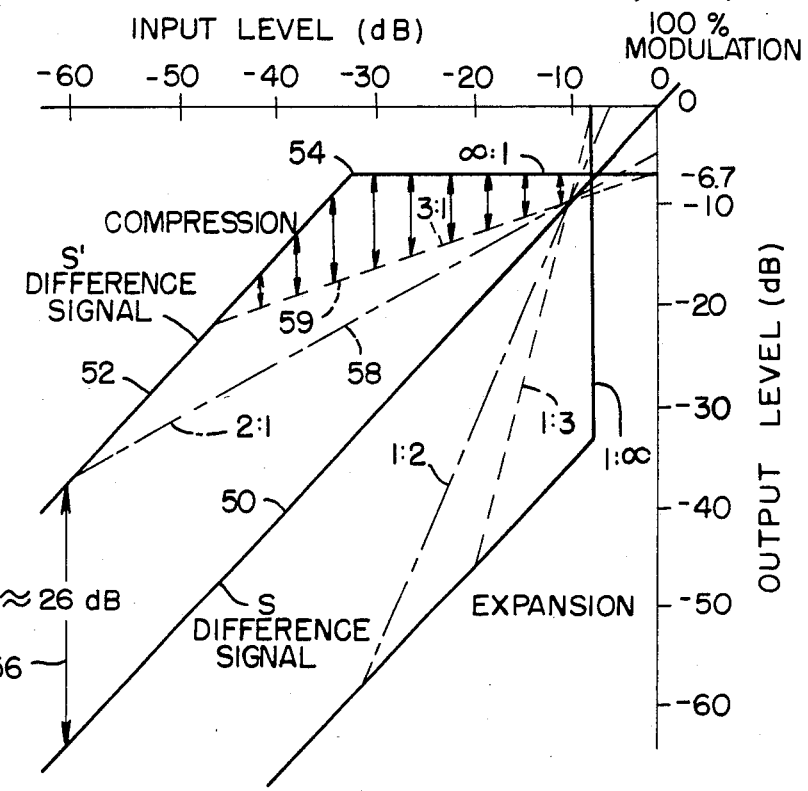
FIG. 5 shows the steady state compression and expansion characteristics of one companding law useful in the FM broadcasting system according to the invention.

FIG. 5 is a conventional signal level diagram which depicts the steady state characterstics of an infinity-to-one companding system of which compressor 16 (of either the feedback or feed-forward type) forms a part. The input signals to be processed for compression or expansion are represented along the abscissa between −60 dB and a standard operating level of 0 dB. The absolute value of the input voltage rises along the abscissa from left to right up to the rated level. The output levels for compression or expansion are represented along the ordinate between −60 dB and 0 dB. The absolute value of the output voltage rises along the ordinate, from the bottom to the top, up to the rated level.

Curve 50 represents the relation between the output and input levels of the normal difference signal S which, since it is not subjected to compression, has a gain slope of one, and is included in the diagram primarily for reference purposes.

Curve 52 represents the relation between the output and input signal levels of the compressor 16. For input signal levels in the range between −60 dB or lower and about −32.7 dB, the characteristic 52 has a compression slope of one, so that input signal levels lower than −32.7 dB relative to the rated level are not compressed. For input signal levels higher than about −32.7 dB relative to the rated level, the characteristic has a compression slope of infinity; that is, beginning at the knee 54 of the characteristic, in this example set at −32.7 dB, the output level is the same regardless of the level of the input signal, which in this example is at a level of −6.7 dB relative to the rated level. Although this results in the received signal level being ambiguous in that it may correspond to many levels, by combining the S and S' signals at the receiver the infinity-to-one companding law for the S' signal can be accurately decoded; more particularly, the S and S' signals are combined at the receiver in such a way that the combination of S and S' gives a final slope to the characteristic into the expander which differs from inifinity-to-one. Thus, unlike currently conventional companding systems which require a prescribed curve for the input/output characteristic in order to build a complementary expander that will track the input signal without the need for a separate pilot tone or other means, the expander characteristic in the present system differs from the compressor characteristic by reason of the combination of the S and S' signals at the receiver which, in turn, enables the use of the infinity-to-one compressor characteristic in the first place. It can be seen that the dynamic range of input signals between −60 dB and −32.7 dB has been compressed to a range between −34 dB and −6.7 dB for the output signals, and that between the break point 54, which occurs when the amplitude of the input signals begin to exceed the threshold $V_{ref}$, the output level remains at −6.7 dB. While the breakpoint 54 can be set at input levels other than −32.7 dB, depending on the nature of the noise likely to be encountered in the transmission channel, it is important to the performance of the system that the slope of the characteristic be exactly one for input signal levels below the break point. The vertically oriented arrow 56 extending between the characteristic 50 for the S signal and the compressor characteristic 52 represents the approximately 26 dB gain increase in the S' difference signal as compared to the difference signal S required to compensate for the noise penalty for stereophonic programming relative to monophonic.

An important advantage of using the infinity-to-one compression law for the S' difference signal can be seen from a comparison of its characteristic with the 2:1 compression characteristic typically employed in the "CX" companding system described in U.S. Pat. No. 4,376,916, shown in the dash-dot line curve 58 and a 3:1 compression characteristic shown by the dashed line curve 59. Compared to the 3:1 compression characteristic, as indicated by the vertical arrows, the infinity-to-one compression characteristic 52 gives a 10 dB to dB improvement against noise modulation or "pumping", often an anomoly of companding systems. Stated another way, the infinity-to-one compression law reduces the audibility of noise pumping yet still gives improved signal-to-noise ratio for input signals throughout the range from about $-44$ dB to about 0 dB. In particular, at the lower end of this range of levels, the ear is very sensitive to noise pumping caused by lack of sufficient program level to mask the noise so that slight variations in level of the program enables the ear to hear variations in the level of the noise. It is seen from comparison of characteristic 52 with the 2:1 characteristic 58 that the improvement is even greater; for example, at an input signal level of $-30$ dB there is an improvement of about 15 dB of output signal level relative to a compressor having the 2:1 characteristic.

A further advantage of the infinity-to-one compression law over the 3:1 compression characteristic is that the knee 54 occurs at an input level of $-32.7$ dB whereas the 3:1 curve of a "CX" expander has to have the knee set at $-49$ dB in order to get the same total amount of compression of an acceptable signal level. Thus, in the case of a "CX" expander having a 3:1 compression law, by definition, gain variations are still occurring at input signal levels of $-49$ dB, causing the operating signal-to-noise ratio level at that point to be much lower than in the case of the infinity-to-one characteristic, thus making the noise pumping all the more audible.

Figure 6:
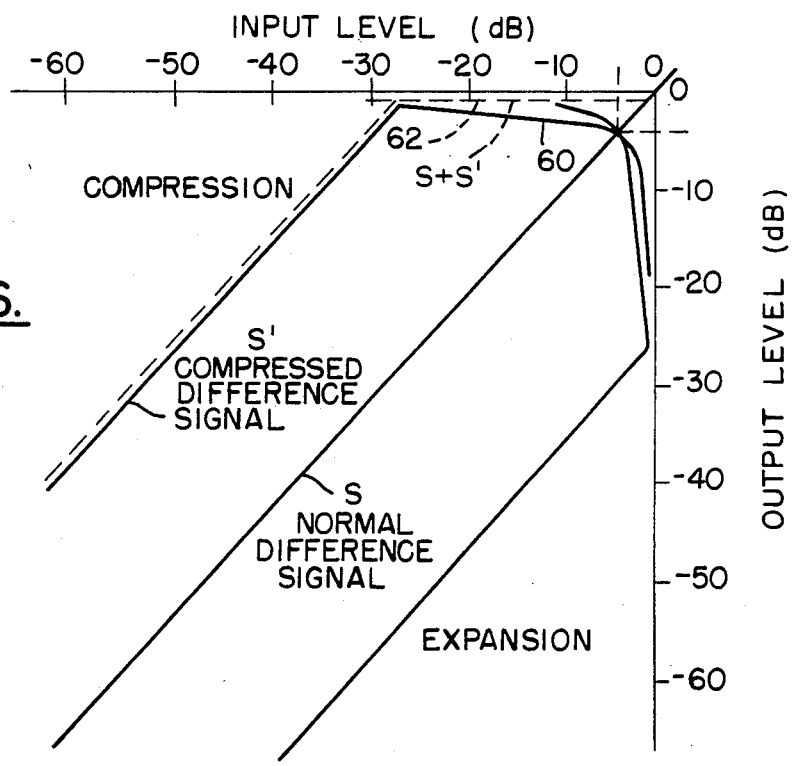
FIG. 6 shows the steady state compression and expansion characteristics of another companding law useful in the system.

While the described infinity-to-one companding characteristic provides the listed advantages, it is possible, by virtue of utilizing both the S and S' difference signals at the receiver, to use a greater than infinity-to-one characteristic for the S' difference signal and thereby achieve additional advantages. More specifically, as shown in the signal level diagram of FIG. 6, it is possible to use a compressor having a characteristic 60 for the S' difference signal which extends with a slope of one up to within a dB or two of 100% modulation and then gradually drops back from that level as the level of the S difference signal rises, such that addition of the S and S' signals gives an infinity-to-one characteristic (depicted by dotted line characteristic 62) that is always maintained at a level such that the square root of the sum of the squares of signals S and S' does not exceed 100% modulation. The curve 60 has a re-entrant characteristic in the sense that it starts to come down, from a break point at an input level of about $-28$ dB, as the level of the S difference signal increases, and intersects the S difference signal curve at the $-3$ dB point. This somewhat unusual characteristic can be quite easily derived by subtracting the difference signal S from the output of a regular infinity-to-one compressor having the characteristic illustrated in FIG. 5. This re-entrant characteristic not only permits maximum possible modulation of the 38 kHz transmission signal, it also insures that the 38 kHz sub-carrier has substantially constant amplitude over a wide dynamic range of program level; that is, this characteristic makes it possible to transmit at about 100% modulation all of the time, which is the best that can be done in any communication system.

A first embodiment of a receiver according to the invention is shown in the block diagram of FIG. 7 and, again, in the interest of simplicity, some of the more conventional FM receiver circuits (e.g., RF and IF stages and discriminator networks) have not been shown and will be only briefly mentioned as necessary. A received FM signal is amplified in the RF and IF stages (not shown) of a receiver/FM demodulator 70, and demodulated in any of the known FM detection circuits (not shown) to derive the audio signals contained in the received signal, namely, the signals M, S, S' and the pilot, each with the indicated amplitude coefficient. The monophonic sum signal M is separated from the higher frequency components of the composite signal by a low-pass filter 72 and applied as one input to a de-matrixer circuit 74 of conventional design. The remaining components of the composite signal are selected by a bandpass filter 76 designed to pass frequencies in the band from 19 kHz to 53 kHz and to reject frequencies below this band, and then applied to an S demodulator 78 and to an S' demodulator 80. The pilot signal is derived by means (not shown) and applied to a carrier generator 82 which regenerates quadrature versions thereof, sin $\omega t$ and cos $\omega t$, which are applied to demodulators 78 and 80, respectively. So as to derive the unchanged difference signal S and the compressed difference signal S', which has the function of $(L-R)$ established by the compressor at the transmitter, the S and S' signals are summed in an adder 84 and the sum signal is applied to an expander 86 wherein the signal S' is complementarily expanded (in a manner to be described) to obtain the difference signal S at its output for delivery via an optional de-emphasis circuit 87 (if required) to a second input to de-matrixer 74 when a switch 88 is in the position shown. The de-matrixer 74, which may be of the conventional construction illustrated in the aforementioned Torick/Keller patent including an adder and a subtractor, combines the M and noise-reduced S signals to produce as outputs the signals 2L and 2R, the amplitude of which is then reduced by one-half to obtain signals L and R for application to the left and right loudspeakers, respectively (not shown), all typical of the mode of operation of a conventional two-channel FM receiver.

In addition to operating as just described, the receiver is fully compatible with conventional monophonic and two-channel (biphonic) stereophonic broadcasts. When a monaural broadcast is being received, the output of the receiver/FM demodulator 70 comprises only the monaural signal M consisting of $(L+R)$. This signal is selected by low pass filter 72 and applied to de-matrixer 74, and since no signal is applied to the second input of the de-matrixer, only the signal M appears at each output of the de-matrixer for application to the left and right loudspeakers, respectively.

For enabling the receiver to reproduce a received conventional two-channel stereo signal, the switch 88 is actuated, preferably automatically, from the position shown to the dotted line position so as to connect the output of the S demodulator 78 to the second input of de-matrixer 74. Such automatic switching can be achieved, for example, by any of several known techniques, such as modulating the pilot tone, or adding a separate identification signal, when a compressed difference signal is transmitted; a detector in the receiver (not shown) responsive to the identification signal produces a signal for actuating the switch 88 from the solid line position to the position shown by dotted line in FIG. 7. Thus, when a conventional two-channel stereo signal is received, the M signal, as before, is applied to one input of de-matrixer 74, and the S signal, derived from demodulator 78, are combined in the de-matrixer to produce output signals 2L and 2R, the amplitude of each of which is reduced by one-half prior to application to the left and right loudspeakers, respectively.

Figure 7:
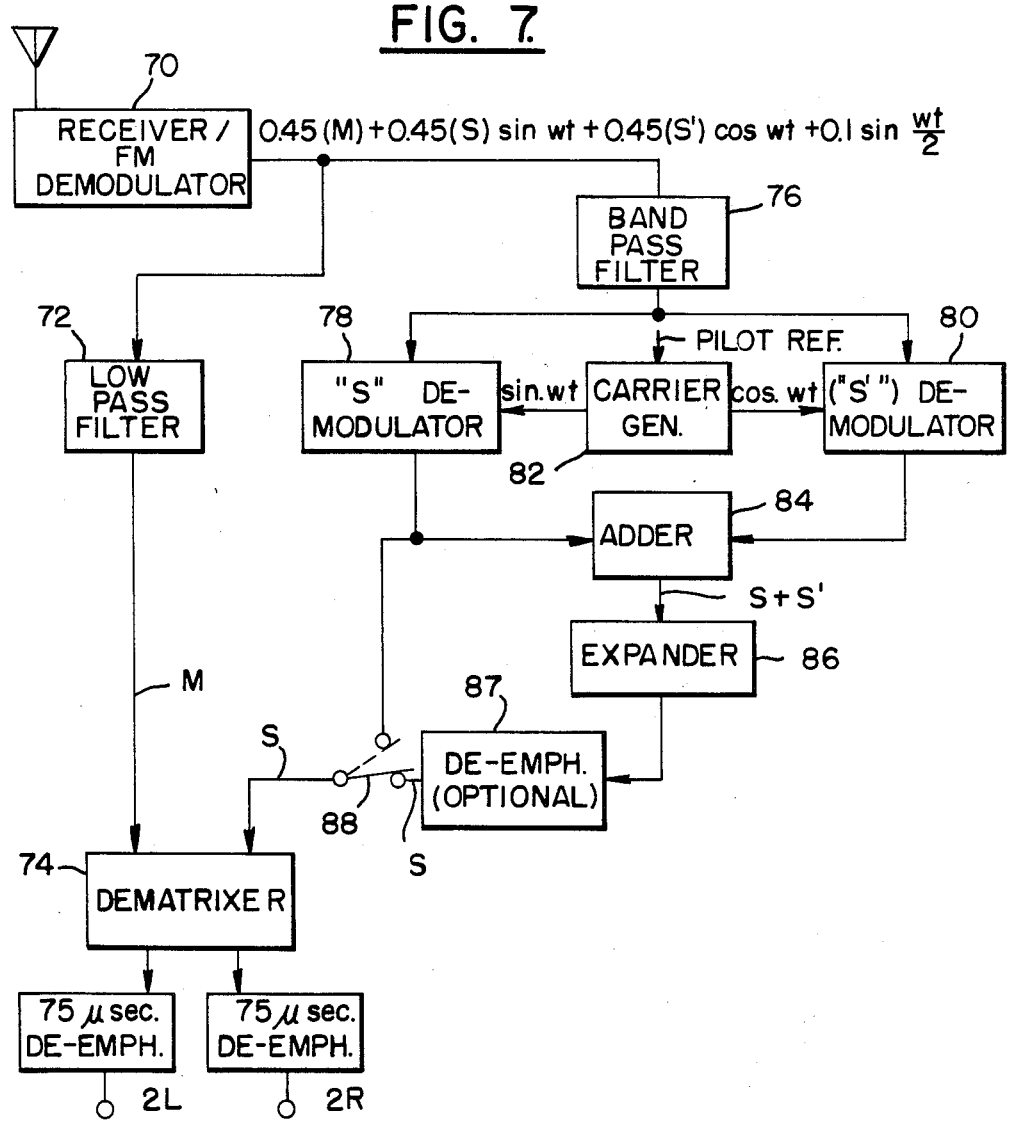
FIG. 7 is a simplified block diagram of one embodiment of a receiving terminal constructed in accordance with the invention.
Figure 8:
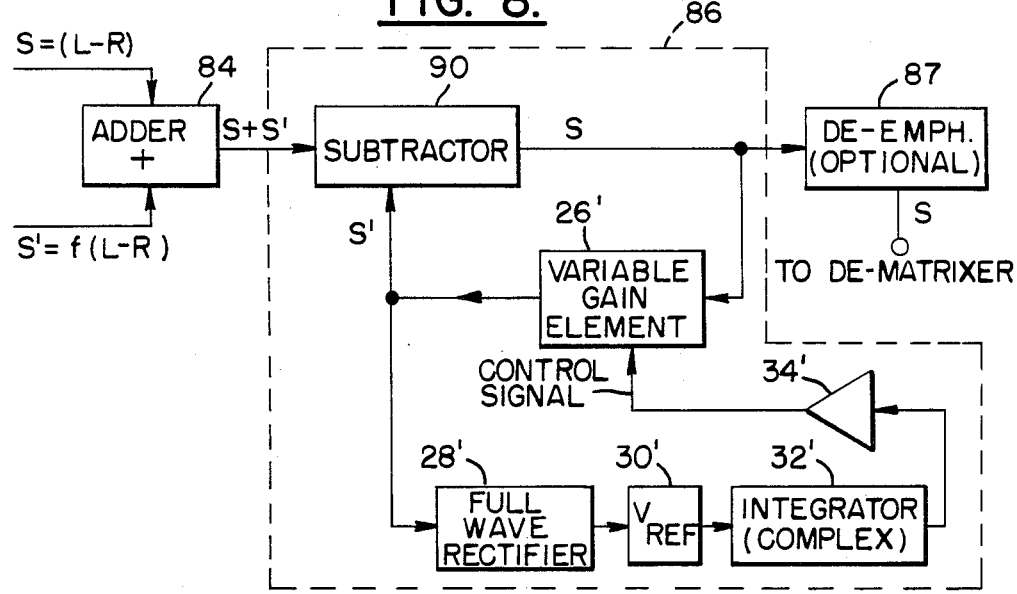
FIG. 8 is a simplified block diagram of an expander for use in the receiver system of FIG. 7.

FIG. 8 is a block diagram of the expander 86 of FIG. 7 for complementarily expanding a signal compressed at the transmitter with the feedback type compressor shown in FIG. 3. Repeating a portion of the block diagram of FIG. 7, the S and S' signals from demodulators 78 and 80, respectively, are summed in adder 84 and applied to the expander 86 which essentially comprises a compressor of the type shown in FIG. 3 and a subtractor circuit 90. The subtractor 90 is arranged to subtract from the sum signal (S+S') a noise-reduced signal S' derived by feeding the output signal from subtractor 90 through a varible gain element 26' to the subtractor and controlling the gain of variable gain element 26' with a control signal derived from its output signal, which is the same as the signal applied to subtractor 90. The control signal generating loop is the full equivalent of the comparable control loop of the compressor shown in FIG. 3 and accordingly its components are identified by corresponding, but primed, reference numerals. The subtractor 90 may be a simple comparator amplifier having high stability, and if the other components are identical to corresponding commponents of the compressor the expander will be complementary with the compressor. The requirement that the signal S appear at the output of subtractor 90 while the signals at its two inputs are (S+S') and S', respectively, is met by the variable gain element 26' having a very low phase delay at the highest audio frequency encountered, which is about 15 to 16 kHz. In other words, the delay through the variable gain element must be less than a few degrees at 16 kHz, or a few microseconds. In practice, the subtractor 90 preferably comprises an operational amplifier having a transit delay of the order of 100 nanoseconds, and similarly for variable gain element 26', thereby to enable subtraction of two signals which seemingly haven't yet arrived. The resultant output signal S, then, is the sum of the S signal and the noise-reduced S' signal which, by virtue of the noise reduction in the S' signal when the S and S' signal levels are equal, has a signal-to-noise ratio 3 db better than if only the usual difference signal (L−R) were used. Further details of the received improvement in signal-to-noise ratio as a function of input signal level will be described later. The output signal from subtractor 90 is applied to the operational de-emphasis circuit 87, if required, and then applied to de-matrixer 74. It will be understood that the de-emphasis circuit would be inserted only if pre-emphasis was employed in the transmission chain.

Figure 9:
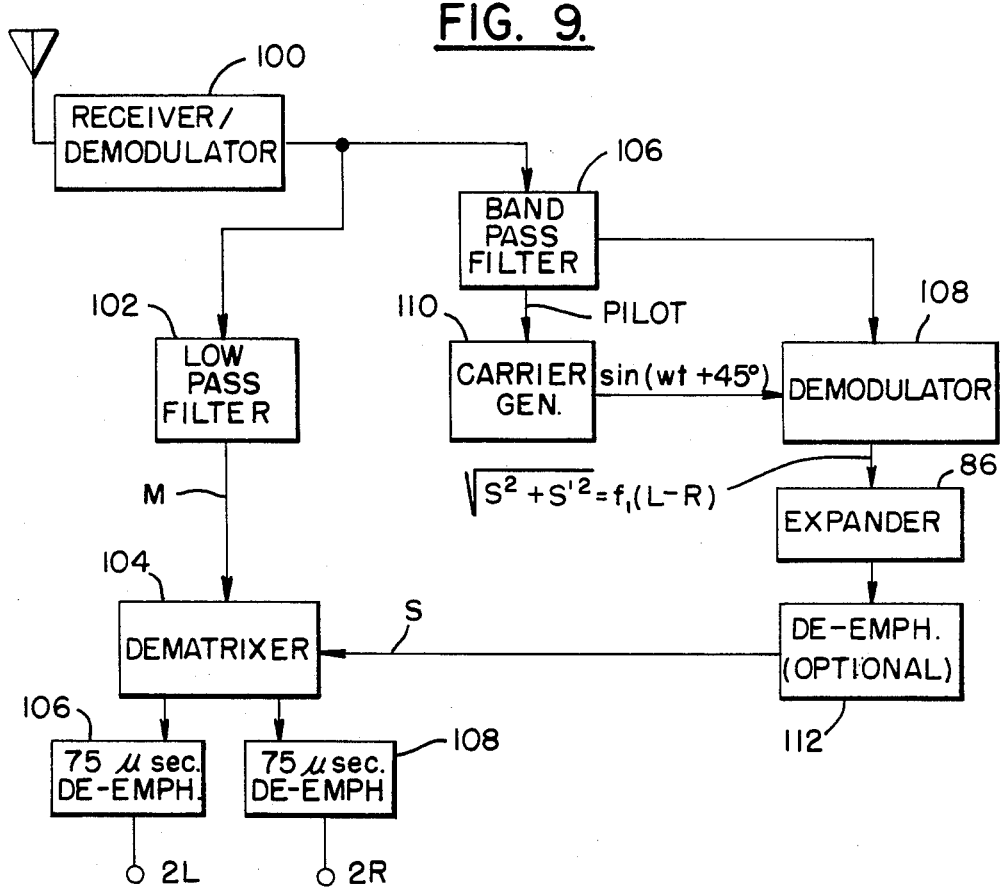
FIG. 9 is a simplified block diagram of an alternative receiving terminal embodying the invention.

Referring now to FIG. 9, there is shown in block diagram an alternative form of receiver in which demodulation and summing of the unchanged difference signal S and the compressed difference signal S' is accomplished by using a single quadrature demodulator having a decoding axis set at 45° to the normal carrier generator axes of sin $\omega t$ or cos $\omega t$. Again, some of the more conventional FM receiver circuits (e.g., RF and IF stages and discriminator networks) have not been shown and will be only briefly mentioned. A received FM signal is amplified in the RF and IF stages (not shown) of a receiver/FM demodulator 100, and demodulated in any of the known FM detection circuits (not shown) to derive the audio signals contained in the received signal, namely, the signals M, S and S' and the pilot. The monophonic sum signal M is separated from the higher frequency components of the composite signal by a low-pass filter 102 and applied as one input to a de-matrixer circuit 104 of conventional design. The remaining components of the composite signal are selected by a bandpass filter 106 designed to pass frequencies in the band from 19 Khz to 53 Khz and to reject frequencies below this band. The S and S' signals are applied to a quadrature demodulator 108 having a demodulation axis set at 45°, and the pilot signal is derived (by conventional means not shown) and applied to a carrier generator 110 which regenerates responsively thereto a signal sin $(\omega t + 45°)$ (or, alternatively, cos $(\omega t - 45°)$) which is applied to demodulator 108. By using the single quadrature demodulator, the demodulation and summing of the S and S' signals take place simultaneously, in one shot, and, as indicated, the output signal from the demodulator will be the square root of the sum of the squares of the S and S' signals, and a function of the (L−R) difference signal applied to the transmitter. This signal is applied to the expander 86, which may have a configuration similar to the expander shown in FIG. 8, wherein the signal is expanded to obtain a noise-reduced output signal corresponding to the original difference signal S. This signal is applied to an optional de-emphasis network 112 (if required) and then applied to a second input to de-matrixer 104 for combination with the sum signal M to produce as outputs the signals 2L and 2R, the amplitude of which is then reduced by ½ to obtain signals L and R for application to the left and right loudspeakers, respectively (not shown), all typical of the mode of operation of a conventional two-channel FM receiver, including subjecting the de-matrixer output signals to the usual 75 $\mu$sec de-emphasis in networks 106 and 108.

Although a 45° decoder has been described in detail by way of example, it will be understood that demodulation axes other than 45° may be used. The results will be similar except for the introduction of a ratio between the gain coefficients for the S and S' signals in the summing action. Such other axis angle may be preferable over the 45° axis angle under certain conditions.

Although the system of FIG. 9 cannot reproduce a conventional two-channel stereo signal, it is fully compatible with conventional monophonic broadcasts. When a monaural broadcast is being received, the output of receiver/FM demodulator 100 comprises only the monaural signal M consisting of (L+R). This signal is selected by low-pass filter 102 and applied to de-matrixer 104, and since no signal is applied to the second input of the de-matrixer, only the signal M appears at each output of the de-matrixer for application to the left and right loudspeakers, respectively.

Figure 10:
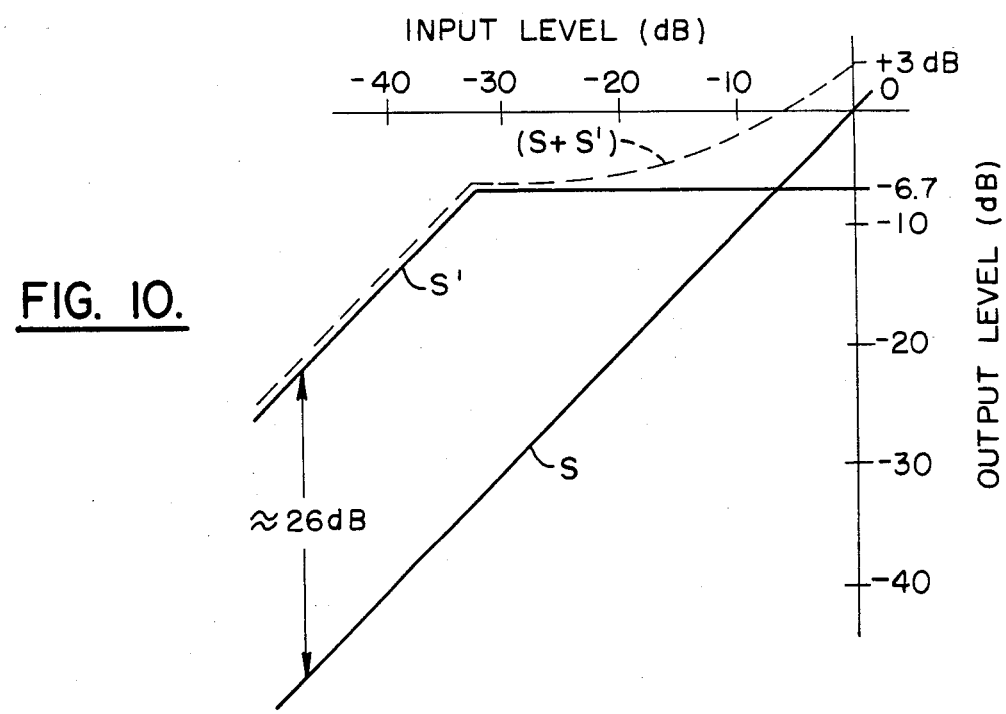
FIG. 10 are curves showing the level of the sum of the output signals of the two demodulators of the receiver shown in FIG. 7.

It will have been seen from the foregoing that there are basically two different ways of using the S signal in the receiver's decoder: (1) two-axes decoding shown in FIG. 7 using sin ωt and cos ωt demodulators for respectively deriving the S and S' signals, adding S and S' together and expanding the sum, and (2) 45° axis decoding shown in FIG. 9, in which demodulation and summing of the S and S' signals both happen in one process and expanding the resulting signal. The relative merits of these two approaches will be seen from a comparison oF FIGS. 10 and 11 which respectively illustrate the level of the output of the adder 84 in the two-axes demodulator of FIG. 7 (i.e., S+S') and the level of the output signal from the single 45° axis decoder of FIG. 9 (i.e., the square root of the sum of $S^2+S'^2$), both as a function of input level. Both figures include the usual input/output curves, the curve for the unchanged difference signal S having unity slope and the curve S' for the difference signal compressed with the infinity-to-one compressor described earlier. The knee of the compressor is set at about $-32.7$ dB, above which the output level is $-6.7$ dB regardless of the level of the input signal. Referring specifically to FIG. 10, the dotted line curve labeled (S+S') depicts the level of the output signal from adder 84 (FIG. 7) as a function of input signal level and is seen to gradually increase from $-6.667$ dB at an input level of about $-32.7$ dB to about 3.3 dB for 0 dB maximum input signal level. As has been described previously, separate demodulation of the two axes has the effect of introducing two statistically independent random noise generators which together add 3 dB of noise to the transmission link noise but, since the output signal rises by 6 dB at the $-6.7$ dB input level, there is a net improvement of 3 dB in signal-to-noise ratio.

Figure 11:
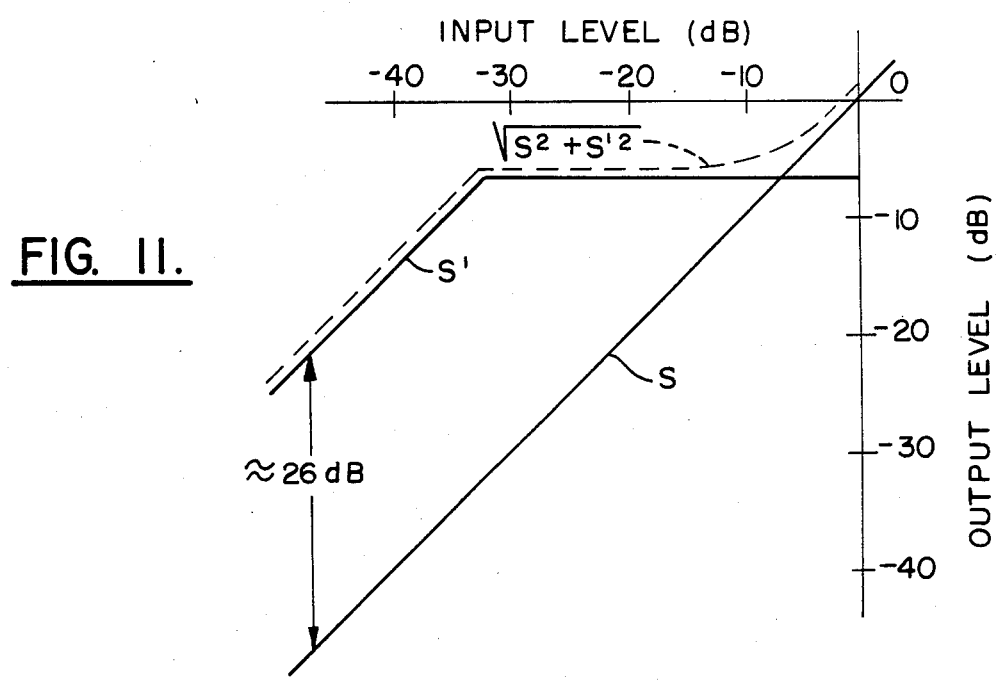
FIG. 11 are curves showing the level of the output signal from the single demodulator of the receiver shown in FIG. 9.

Turning now to FIG. 11, it will be noted that the dotted line curve labeled $\sqrt{S^2+S'^2}$, for input S and S' signals identical to those depicted in FIG. 10, also increases gradually, but not as steeply as the dotted line curve in FIG. 10, to a level of about $+0.8$ dB at an input level of 0 dB, as compared to the plus 3.3 dB in FIG. 10. However, the signal-to-noise ratio is the same as for the other case because the noise contributed by the demodulator, since it has but a single axis, will be 3 dB less than for the two-axes case in which there was an increase in signal level but also more noise. In the single axis demodultor of FIG. 9, not only does the demodulator contribute less noise than do the two demodulators of the FIG. 7 system but there is a lower output signal level because of the fact that the demodulator derives the square root of $(S^2+S'^2)$.

Figure 12:
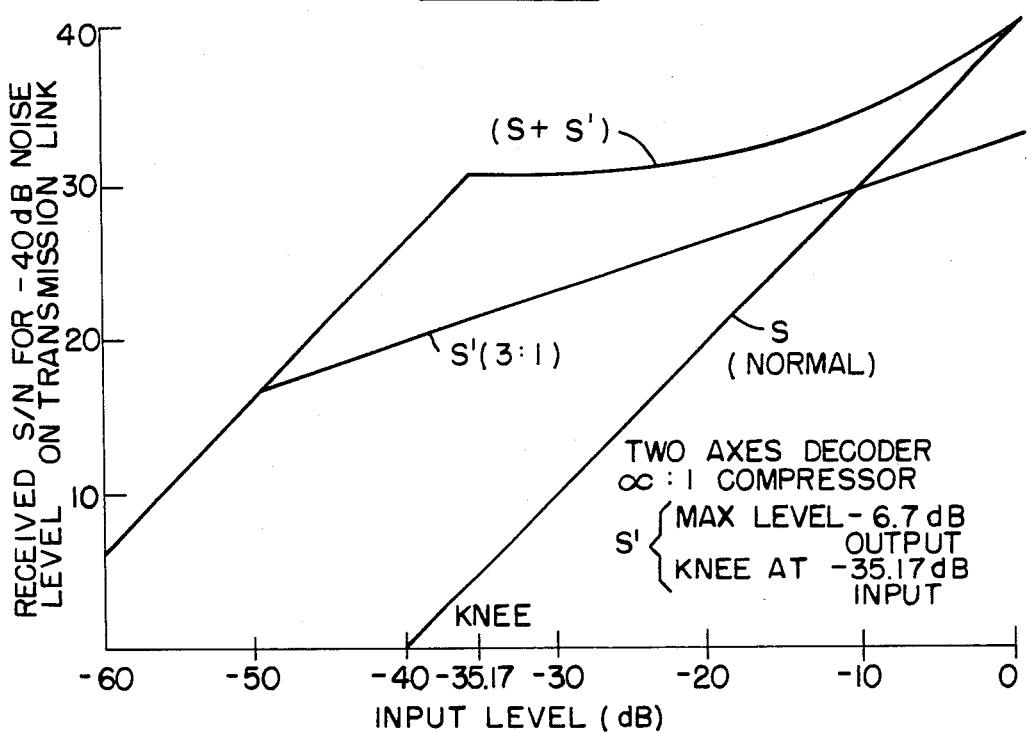
FIG. 12 are curves showing signal-to-noise ratio as a function of input level of the stereo difference signal for the two-axes demodulator of FIG. 7.
Figure 13:
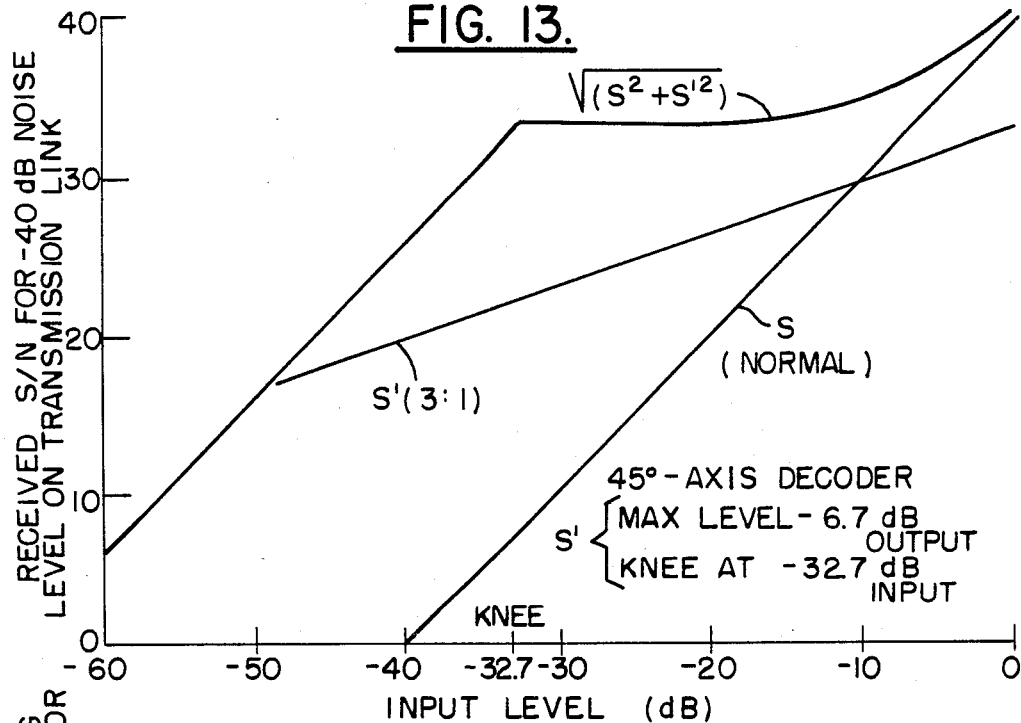
FIG. 13 are curves showing signal-to-noise ratio as a function of input level of the stereo difference signal for the single axis 45° demodulator of FIG. 9.

FIGS. 12 and 13 respectively depict signal-to-noise ratio as a function of input signal level, with an arbitrarily chosen $-40$ dB noise level on the transmission medium, for the two-axes demodulating system of FIG. 7 and the single-axis modulator of the FIG. 9 receiver. Each of these figures show three curves: (1) a straight line labeled S having unity slope relating the unchanged difference signal to signal-to-noise ratio; (2) a curve labeled S' which depicts signal-to-noise ratio as a function of the level of the difference signal compressed by 3:1 compressor; and, (3) a curve labeled (S+S') in FIG. 12, and labeled $\sqrt{S^2+S'^2}$ in FIG. 13, which depict signal-to-noise ratio as a function of input level for the case where the S' signal is compressed according to the infinity-to-one compression law. Considering first the third curve of FIG. 13, which shows the signal-to-noise ratio for the single axis 45° decoder, it is seen that the signal-to-noise ratio is improved at the higher input signal levels, and that at 0 dB input level the signal-to-noise ratio is slightly better than it is for the unchanged difference signal S; this is the result of taking the square root of the sum of the squares of the unchanged and compressed difference signals.

The same curve in FIG. 12, for the case in which the unchanged and compressed difference signals are derived from separate demodulators, there is a noise contribution from two axes, or 3 dB more noise than in the single-axis case, and, furthermore, the actual received signal level is now (S+S'), which does not involve squares and square roots; thus, the derivation of the exact signal-to-noise ratio as a function of signal level involves a different set of calculations than for the corresponding curve for the single-axis case.

Figure 12A:
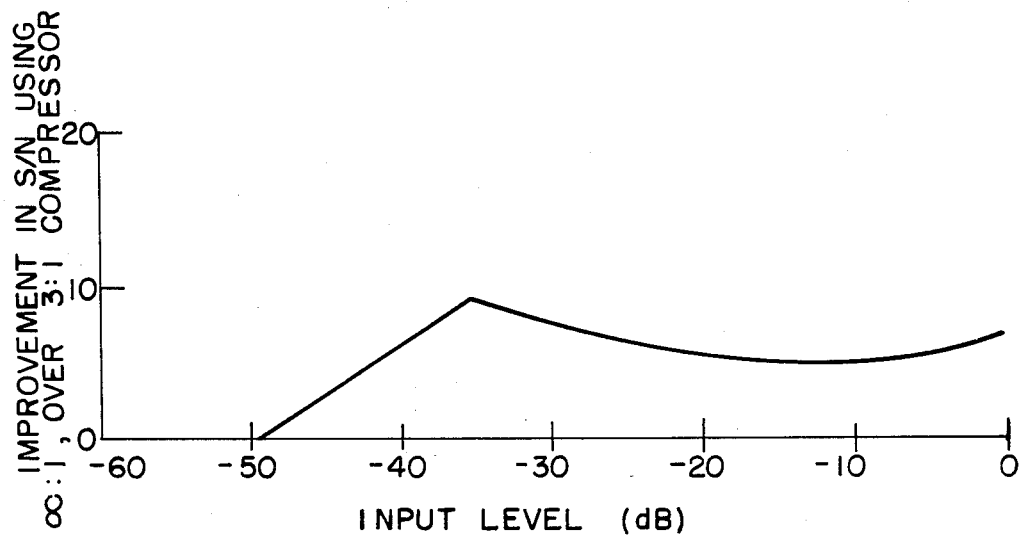
FIG. 12A is a curve showing the improvement in signal-to-noise ratio of the two-axes demodulator of FIG. 7 with an infinity-to-one compressor over that of a 3:1 compressor.
Figure 13A:
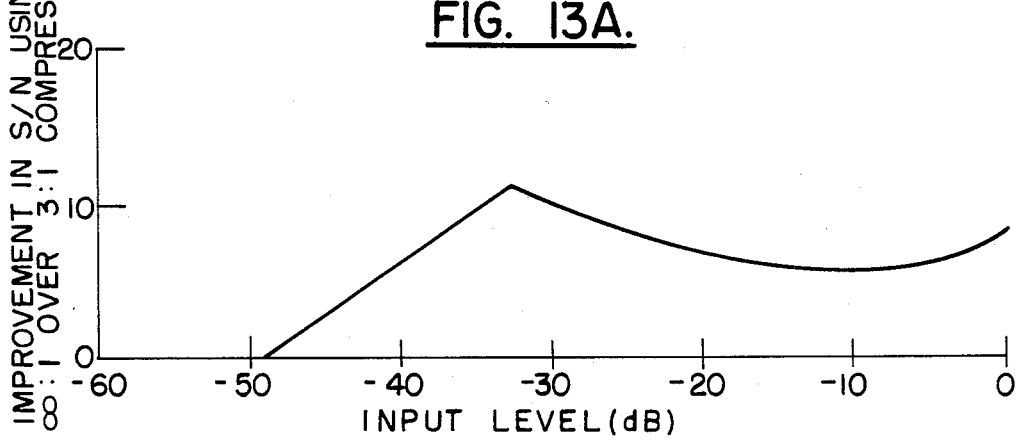
FIG. 13A is a curve showing the improvement in signal-to-noise ratio of the single axis demodulator of FIG. 9 with an infinity-to-one compressor over that of a 3:1 compressor.

The shape of the curve for the two cases is generally the same but they differ by one or two dB here and there, as will best be seen from a comparison of FIGS. 12A and 13A which show the improvement in signal-to-noise ratio realized from using an infinity-to-one compressor instead of a 3:1 compressor for the two-axes demodulator case and the single 45°-axis demodulator case, respectively. It will be noted in both figures that at input levels of about $-49$ dB the signal-to-noise improvement of the infinity-to-one compressor goes to zero; this stems from the fact that in order to have a fair comparison the signal level performance was arbitrarily chosen such that in the absence of signal, the background noise level will set the infinity-to-one compressor to have the same noise improvement as the 3:1 compressor, that value being about 26 dB of noise improvement. Also the maximum signal levels for both were arbitrarily set at the same value of $-6.7$ dB, as was the output for maximum input signal level. The curves of FIGS. 12A and 13A are also of the same basic shape, but have differences in detail which graphically show the differences between the curves of FIGS. 12 and 13, most notably at the $-35$ dB input level, where the single axis 45° decoder has about a 2 dB advantage in the improvement as compared to the two-axes decoding method. The reason for this is the contribution of noise by the two demodulation axes, which causes the slightly lower received signal-to-noise ratio for the two-axes case. However, the 9 dB improvement in signal-to-noise ratio as compared to a "CX" compressor, for example, is still significant.

Besides its signal-to-noise superiority over the two-axes demodulator, the single 45° axis decoder has the further advantage that conventional stereo receivers currently utilize a single-axis decoder, albeit one fed by a sin ωt signal rather than the sin(ωt+45°) required for the demodultor of FIG. 9. Furthermore, the circuit is somewhat less expensive to manufacture in that less components are required for demodulating and summing in a single operation.

Figure 14:
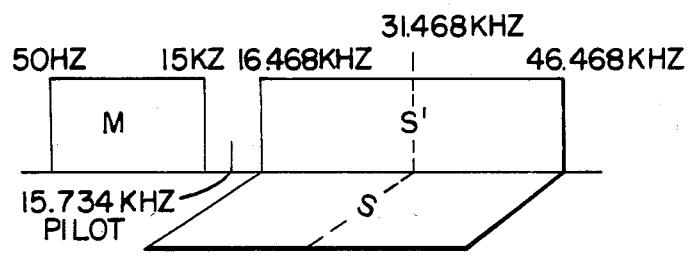
FIG. 14 is a frequency diagram of the composite baseband signal developed in accordance with the invention for FM stereo television transmission.

As has been briefly discussed previously, the principles of the present invention are also applicable to the recently agreed EIA/dbx stereo television system. As shown in FIG. 14, the baseband spectrum of this system comprises a monophonic channel M from about 50 Hz to 15 kHz, representing the sum of stereophonically related left and right signals, and a compressed stereophonic difference signal S' from 23 kHz to 53 kHz, which is transmitted as a double-sideband suppressed sub-carrier signal S' sin ωt, for example (or S' cos ωt).

The baseband signal also includes a pilot signal positioned in the gap between the M channel and the difference signal channel. The pilot frequency is the horizontal line frequency of the NTSC television system, namely, 15.734 kHz, and the sub-carrier frequency is the second harmonic of the pilot frequency, or 31.468 kHz.

In accordance with the present invention, the baseband signal would additionally include an uncompressed difference signal S transmitted as a double-sideband suppressed kHz sub-carrier in quadrature with the compressed difference signal sub-carrier (so as not to require any additional spectrum). This composite signal would be frequency modulated onto a high frequency carrier for transmisison purposes, using a transmitter substantially as shown in FIG. 2. Because the signal includes the sum signal M and the compressed difference signal S', it is compatible with existing EIA/dbx receivers, and there would be no loss in service area. Unlike the EIA/dbx stereo television receiver, in which only the expanded version of the received compressed difference signal is matrixed with the sum signal M to obtain the original left and right channel signals, the receiver would combine the uncompressed difference signal S and the compressed difference signal S', using, for example, the adaptive expander described in the aforementioned co-pending application Ser. No. 688,854 to achieve the above-described improvement in signal-to-noise ratio in the received signal and with less noise pumping. Such adaptive decoder is controlled by the uncompressed, and thus unmodified, difference signal and is, therefore, capable of recovering dynamic level, frequency, and attack and recovery time constant information contained in the original difference signal.

It should now be evident that the transmission of the uncompressed difference signal S along with a compressed version S' of the difference signal, and the utilization of both at the receiver to obtain a noise-reduced difference signal, provides several improvements in FM stereophonic radio and television broadcasting systems including (1) increased channel capacity, (2) improved received signal-to-noise ratio as compared to currently available companding systems and (3) the ability to decode the uncompressed difference signal and the compressed difference signal either separately or together, all of these advantages being realizable while maintaining compatibility with existing FM and biphonic receivers in the case of radio, and with the EIA/dbx system in the case of television. As applied to FM stereo radio, the utilization of both compressed and uncompressed difference signals at the receiver provides the further advantage of enabling the use of any of several companding characteristics, with their attendant advantages, including the infinity-to-one and re-entrant characteristics shown in FIGS. 5 and 6.

The described specific embodiments are susceptible of modification in form and detail within the scope of the invention, and to adaptation for use in applications other than those described. For example, the level of the break points of the companding characteristics may be different from those specifically described by way of example, and the nature of the integrators in the control generator circuits of the compressors and expanders are susceptible of some latitude. The specific illustrative embodiments are exemplary only, and such variations and modifications as will now be suggested by those skilled in the art will be understood as forming a part of the present invention insofar as they fall within the spirit and scope of the appended claims.

I claim:

1. A method for extending the range and for increasing the channel capacity of an FM stereophonic radio broadcast system as compared to the conventional two-channel FM stereophonic system while maintaining compatibility with conventional monophonic and two-channel receivers, comprising the steps of:
    transmitting sum (M) and difference (S) signals respectively corresponding to the sum of left and right channel stereophonic signals and to the difference between the left and right channel stereophonic signals, and a compressed difference signal (S') which contains substantially the same information as said difference signal (S) and is compressed according to a desired compression law,
    receiving said sum signal M, said difference signal S and said compressed difference signal S',
    combining the received difference signal S with the received compressed difference signal S' and expanding the combined signal to obtain a noise-reduced difference signal having an amplitude level substantially equal to that of the received difference signal S, and
    de-matrixing the received sum signal M with the noise-reduced difference signal to obtain said left and right channel stereophonic signals.

2. Method according to claim 1, wherein said step of combining and expanding comprises the steps of:
    separately demodulating the received difference and compressed difference signals S and S',
    summing said demodulated signals S and S' to obtain the sum signal (S+S'), and
    expanding said sum signal to obtain said noise-reduced difference signal.

3. Method according to claim 1, wherein said step of combining and expanding comprises the steps of:
    quadrature demodulating the received difference and compressed difference signals S and S' and producing an output signal representing the square root of the sum of the squares of the signals S and S', and
    expanding said output signal to obtain said noise-reduced difference signal.

4. Method according to claim 1 in which the step of transmitting includes the step of
    compressing said difference signal in accordance with an infinity-to-one characteristic having a slope of one for input signal levels below a predetermined level and a slope substantially equal to infinity for input signal levels greater than said predetermined level.

5. Method according to claim 1 in which the step of transmitting includes the step of
    compressing said difference signal in accordnace with a re-entrant characteristic having unity slope for input signal levels below a first predetermined level, and a slope slightly less then infinity for input signal signal levels greater then said first predetermined level and less then a second higher predetermined level.

6. Method according to claim 1 wherein the step of transmitting includes the steps of
    amplitude-modulating first and second sub-carrier signals with said difference signal S and with said compressed difference signal S', respectively, and
    modulating said sum signal M and the said modulated sub-carrier signals onto a high frequency carrier for the purpose of transmitting the same.

7. Method according to claim 6 wherein said first and second sub-carrier signals have the same frequency and are displaced relative to each other by 90°.

8. A receiver for use in a biphonic FM radio transmission system including a transmitter having means for combining two independent stereophonically related audio frequency signals L and R to obtain sum and difference signals M and S respectively comprising (L+R) and (L−R), means for compressing the dynamic range of said difference signal S and producing a compressed difference signal S', means for modulating each of two sub-carriers with a respective one of said difference and compressed difference signals S and S', and means for frequency modulating the aforementioned modulated sub-carrier signals and said sum signal M onto a high frequency carrier for the purpose of transmitting the same to one or more remote receivers, said receiver comprising:
  demultiplexing means for deriving said sum signal M, said difference signal S and said compressed difference signal S',
  means for combining the derived difference signal S with the derived compressed difference signal S' and for expanding the combined signal to obtain a noise-reduced difference signal having an amplitude level substantially equal to that of the derived difference signal S, and
  de-matrix means for combining said noise-reduced difference signal with said sum signal M to obtain said left (L) and (R) channel stereophonic signals.

9. A receiver as defined by claim 8 for use with a transmitter in which said sub-carriers are of the same frequency and displaced in phase by 90° and wherein said means for combining and expanding comprises:
  first and second demodulators for separately demodulating the received sub-carrier signals respectively amplitude-modulated by said difference and compressed difference signals S and S' for obtaining said signals S and S',
  means connected to receive and for summing said signals S and S' to obtain the sum signal (S+S'), and
  expander means for expanding said sum signal (S+S') to obtain said noise-reduced difference signal.

10. A receiver as defined by claim 8 for use with a transmitter in which the two sub-carriers have the same frequency and are displaced in phase by 90° and respectively amplitude-modulated by said difference signal S and said compressed difference signal S', wherein said combining and expanding means comprises
  a quadrature demodulator having a single demodulating axis position at 45° with respect to each of said sub-carriers for demodulating the received amplitude-modulated quadrature-related sub-carriers and producing an output signal representing the square root of the sum of the squares of the difference signal S and the compressed difference signal S', and
  means for expanding said output signal to obtain said noise-reduced difference signal.

11. A receiver as defined in claim 9, wherein said receiver further comprises:
  switch means connected to said de-matrix means and operative alternatively to couple the difference signal S obtained from said first demodulator, instead of the noise-reduced difference signal, to said de-matrix means for enabling said receiver for receiving conventional two-channel stereophonic broadcasts.

12. An improved biphonic FM radio transmission system for transmitting independent stereophonically related left and right channel signals, said system comprising:
  at the transmitter
  matrix means for combining the left and right channel stereophonic signals to obtain a sum signal M corresponding to the sum of the left and right channel signals and a difference signal S corresponding to the difference between the left and right channel signals;
  compressor means connected to said matrix means for compressing the dynamic range of said difference signal S to produce a compressed difference signal S' which is compressed according to a desired compression law;
  generating means for generating two sub-carriers of the same frequency and spaced 90° apart in phase and a pilot signal having a frequency which is one-half the frequency of the sub-carriers;
  amplitude-modulating means connected to said generating means, said compressor means and said matrix means for amplitude-modulating each sub-carrier with a respective one of said difference and compressed difference signals S and S' to develop two double-sideband suppressed-carrier signals, the frequency of said sub-carriers being sufficiently high as to insure a frequency gap between the lower sidebands of the modulated sub-carrier signals and the frequency bandwidth of said sum signal M, with the frequency of the pilot signal being located within said gap; and
  frequency modulating means connected for frequency modulating the modulated sub-carrier signals, the pilot signal, and the sum signal M onto a high-frequency carrier for the purpose of transmitting the same to one or more remote receivers; and
  at the receiver
  deriving means for receiving said frequency modulated high-frequency carrier and for deriving said sum signal M and said amplitude-modulated sub-carriers respectively modulated by said difference signal S and said compressed difference signal S';
  means including demodulator means for combining and demodulating the amplitude-modulated sub-carrier signals for producing a combined signal and for expanding the combined signal to obtain a noise-reduced difference signal having an amplitude level substantially equal to that of the received difference signal; and
  de-matrix means connected to receive and for combining said noise-reduced difference signal with said sum signal M to obtain said left and right channel stereophonic signals.

13. A biphonic FM radio transmission system as defined in claim 12, wherein said demodulator means comprises first and second demodulators each for demodulating a different one of said amplitude-modulated sub-carriers to derive said difference signal S and said compressed difference signal S',
  wherein said combining means includes means for summing said difference signal S and said compressed difference signal S' to produce a sum signal (S+S'), and wherein said means for expanding comprises an expander for expanding said sum signal (S+S') to obtain said noise-reduced difference signal.

14. A biphonic FM radio transmission system as defined in claim 13, wherein said receiver further comprises:
switch means connected to said de-matrix means and operative alternatively to couple the difference signal S produced by said first demodulator, instead of the noise-reduced difference signal, to the de-matrix means for enabling said receiver for reproducing conventional two-channel stereophonic broadcasts.

15. A biphonic FM radio transmission system as defined in claim 12 wherein said demodulator means comprises a quadrature demodulator having a demodulation axis positioned at 45° from the axes of the two sub-carriers and connected to receive said amplitude-modulated sub-carriers for producing an output signal representing the square root of the sum of the squares of the difference signal S and the compressed difference signal S' and
wherein said means for expanding comprises and expander connected to receive and for expanding said output signal to obtain said noise-reduced difference signal.

16. A biphonic FM radio transmission system as defined in claim 12, wherein the compressor in the transmitter has a compression characteristic which has unity slope for input signal levels up to a predetermined input signal level and which has infinity slope for input signal levels above said predetermined level.

17. A biphonic FM radio transmission system as defined in claim 12, wherein the compressor in the transmitter has a compression characteristic which has unity slope for input signal levels below a first predetermined level, and a slightly negative slope for input signal levels greater than said first predetermined level and less than a second higher predetermined level.

* * * * *